United States Patent
Bateman (10) Patent No.: US 11,731,490 B2
(45) Date of Patent: Aug. 22, 2023

(54) REFRIGERANT SYSTEM DIAGNOSTICS

(71) Applicant: GM GLOBAL TECHNOLOGY OPERATIONS LLC, Detroit, MI (US)

(72) Inventor: Kale Bateman, Scarborough (CA)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

(21) Appl. No.: 17/305,754

(22) Filed: Jul. 14, 2021

(65) Prior Publication Data
US 2023/0022907 A1 Jan. 26, 2023

(51) Int. Cl.
*B60H 1/32* (2006.01)
*B60H 1/00* (2006.01)

(52) U.S. Cl.
CPC ....... *B60H 1/3205* (2013.01); *B60H 1/00978* (2013.01); *B60H 2001/325* (2013.01); *B60H 2001/3257* (2013.01); *B60H 2001/3272* (2013.01); *B60H 2001/3285* (2013.01)

(58) Field of Classification Search
CPC .......... B60H 1/3283; B60H 2001/3242; B60H 2001/3279; B60H 2001/3239; F25B 2700/19; F25B 2700/191; F25B 2700/1931; F25B 2700/195; F25B 2700/197
See application file for complete search history.

(56) References Cited

U.S. PATENT DOCUMENTS

| | | | | |
|---|---|---|---|---|
| 2010/0043467 A1* | 2/2010 | Kawano | ................ | F25B 13/00 62/129 |
| 2017/0217288 A1* | 8/2017 | Suzuki | ............... | B60H 1/00921 |
| 2017/0326943 A1* | 11/2017 | Ishizeki | ............. | B60H 1/00978 |
| 2019/0248209 A1* | 8/2019 | Ishizeki | ................. | B60H 1/32 |
| 2020/0080760 A1* | 3/2020 | Bahel | ....................... | F25C 1/04 |

\* cited by examiner

*Primary Examiner* — Nelson J Nieves
*Assistant Examiner* — Meraj A Shaikh
(74) *Attorney, Agent, or Firm* — Quinn IP Law (57) ABSTRACT

A refrigerant system includes a compressor, multiple pressure sensors, multiple refrigerant flow valves, and a processor. The compressor is configured to present a refrigerant at a first pressure. A first pressure sensor is configured to measure the first pressure of the refrigerant. A second pressure sensor is configured to measure a second pressure of the refrigerant. The refrigerant flow valves have a plurality of flow valve positions. The processor is configured to calculate a delta value as a difference between the first pressure and the second pressure, calculate an expected delta value between the first pressure and the second pressure based on a ratio of a low-side density of the refrigerant at the compressor to the flow valve positions, and perform a remedial action where the delta value deviates from the expected delta value by greater than a threshold value.

20 Claims, 8 Drawing Sheets

REFRIGERANT SYSTEM DIAGNOSTICS

INTRODUCTION

The present disclosure relates to onboard vehicle diagnostics in general, and in particular, to a system and a method for refrigerant system diagnostics.

In existing vehicles, diagnostic routines for refrigerant systems are performed while the refrigerant systems are not being used. In newer electric vehicles, the refrigerant systems are running more often, including times while the vehicles are parked. Therefore, less time is available to run the diagnostics with the refrigerant systems switched off.

What is desired is a technique for performing the diagnostics on the refrigerant systems while the refrigerant systems are operational.

SUMMARY

A refrigerant system is provided herein. The refrigerant system includes a compressor, a first high-side pressure sensor, a second high-side pressure sensor, a plurality of refrigerant flow valves, and a processor. The compressor has an inlet port and an outlet port, and is configured to present a refrigerant at a first high-side pressure at the outlet port. The first high-side pressure sensor is in fluid communication with the outlet port of the compressor, and is configured to measure the first high-side pressure of the refrigerant. The second high-side pressure sensor is in fluid communication with the inlet port of the compressor, and is configured to measure a second high-side pressure of the refrigerant. The plurality of refrigerant flow valves are coupled in parallel between the first high-side pressure sensor and the second high-side pressure sensor. The plurality of refrigerant flow valves has a plurality of flow valve positions. The processor is configured to calculate a high-side delta value as a difference between the first high-side pressure as measured and the second high-side pressure as measured, calculate an expected delta value between the first high-side pressure and the second high-side pressure based on a ratio of a low-side density of the refrigerant at the inlet port of the compressor to the plurality of flow valve positions, and perform a high-side remedial action where the high-side delta value deviates from the expected delta value by greater than a high-side threshold value.

In one or more embodiments, the refrigerant system includes a first high-side temperature sensor configured to measure a first high-side temperature of the refrigerant between the outlet port of the compressor and the plurality of refrigerant flow valves. The expected delta value calculated by the processor is based on the first high-side temperature.

In one or more embodiments, the refrigerant system includes a low-side temperature sensor configured to measure a low-side temperature of the refrigerant proximate the inlet port of the compressor. The expected delta value calculated by the processor is based on the low-side temperature.

In one or more embodiments, the refrigerant system includes a plurality of high-side check valves disposed between the plurality of refrigerant flow valves and the second high-side pressure sensor.

In one or more embodiments of the refrigerant system, the high-side remedial action closes one or more of the plurality of refrigerant flow valves, and closes a corresponding one or more of the plurality of high-side check valves.

In one or more embodiments of the refrigerant system, the high-side remedial action stops the compressor.

In one or more embodiments of the refrigerant system, the compressor, the first high-side pressure sensor, the second high-side pressure sensor, the plurality of refrigerant flow valves, and the processor form part of a vehicle.

In one or more embodiments of the refrigerant system, the high-side remedial action notifies a driver of the vehicle that an issue has been detected in the refrigerant system.

In one or more embodiments, the refrigerant system includes a low-side pressure sensor in fluid communication with the inlet port of the compressor and configured to measure a low-side pressure of the refrigerant, and a plurality of electronic expansion valves coupled in parallel between the low-side pressure sensor and the second high-side pressure sensor. The plurality of electronic expansion valves have a plurality of expansion valve positions. The compressor is configured to receive the refrigerant at the low-side pressure at the inlet port. The processor is further configured to calculate a sensed delta value as another difference between the second high-side pressure as measured and the low-side pressure as measured, calculate a plurality of expansion valve mass flow rate values of the refrigerant through the plurality of electronic expansion valves based on the sensed delta value and the plurality of expansion valve positions, calculate a compressor mass flow rate value of the refrigerant through the compressor, and perform a low-side remedial action where a sum of the plurality of expansion valve mass flow rate values deviates from the compressor mass flow rate value by greater than a low-side threshold value.

A refrigerant system is provided herein. The refrigerant system includes a compressor, a low-side pressure sensor, a second high-side pressure sensor, a plurality of electronic expansion valves, and a processor. The compressor has an inlet port and an outlet port, and is configured to receive a refrigerant at a low-side pressure at the inlet port. The low-side pressure sensor is in fluid communication with the inlet port of the compressor, and is configured to measure the low-side pressure of the refrigerant. The second high-side pressure sensor is in fluid communication with the outlet port of the compressor, and is configured to measure a second high-side pressure of the refrigerant. The plurality of electronic expansion valves are coupled in parallel between the low-side pressure sensor and the second high-side pressure sensor. The plurality of electronic expansion valves has a plurality of expansion valve positions. The processor is configured to calculate a sensed delta value as a difference between the second high-side pressure as measured and the low-side pressure as measured, calculate a plurality of expansion valve mass flow rate values of the refrigerant through the plurality of electronic expansion valves based on the sensed delta value and the plurality of expansion valve positions, calculate a compressor mass flow rate value of the refrigerant through the compressor, and perform a low-side remedial action where a sum of the plurality of expansion valve mass flow rate values deviates from the compressor mass flow rate value by greater than a low-side threshold value.

In one or more embodiments, the refrigerant system includes a second high-side temperature sensor configured to measure a second high-side temperature of the refrigerant upstream of the plurality of electronic expansion valves. The plurality of expansion valve mass flow rate values calculated by the processor is based on the second high-side temperature.

In one or more embodiments, the refrigerant system includes a low-side temperature sensor configured to measure a low-side temperature of the refrigerant proximate the inlet port of the compressor. The compressor mass flow rate value calculated by the processor is based on the low-side temperature.

In one or more embodiments, the refrigerant system includes a plurality of low-side check valves disposed between the plurality of electronic expansion valves and the low-side pressure sensor.

In one or more embodiments of the refrigerant system, the low-side remedial action closes one or more of the plurality of electronic expansion valves, and closes a corresponding one or more of the plurality of low-side check valves.

In one or more embodiments of the refrigerant system, the low-side remedial action stops the compressor.

In one or more embodiments of the refrigerant system, the compressor, the low-side pressure sensor, the second high-side pressure sensor, the plurality of electronic expansion valves, and the processor form part of a vehicle.

A method for diagnostics in a refrigerant system is provided herein. The method includes presenting a refrigerant at a first high-side pressure through an outlet port of a compressor, where the compressor has an inlet port, measuring the first high-side pressure of the refrigerant with a first high-side pressure sensor in fluid communication with the outlet port of the compressor, measuring a second high-side pressure of the refrigerant with a second high-side pressure sensor in fluid communication with the inlet port of the compressor, and controlling a plurality of flow valve positions of a plurality of refrigerant flow valves. The plurality of refrigerant flow valves are coupled in parallel between the first high-side pressure sensor and the second high-side pressure sensor. The method further includes calculating a high-side delta value as a difference between the first high-side pressure as measured and the second high-side pressure as measured, calculating an expected delta value between the first high-side pressure and the second high-side pressure based on a ratio of a low-side density of the refrigerant at the inlet port of the compressor to the plurality of flow valve positions, and performing a high-side remedial action where the high-side delta value deviates from the expected delta value by greater than a high-side threshold value.

In one or more embodiments, the method includes measuring a first high-side temperature of the refrigerant between the outlet port of the compressor and the plurality of refrigerant flow valves, and measuring a low-side temperature of the refrigerant at the inlet port of the compressor. The expected delta value is based on the first high-side temperature. The expected delta value is based on the low-side temperature.

In one or more embodiments, the method includes receiving a refrigerant at a low-side pressure at the inlet port of the compressor, measuring the low-side pressure of the refrigerant with a low-side pressure sensor in fluid communication with the inlet port of the compressor, and controlling a plurality of expansion valve positions of a plurality of electronic expansion valves. The plurality of electronic expansion valves are coupled in parallel between the low-side pressure sensor and the second high-side pressure sensor. The method further includes calculating a sensed delta value as another difference between the second high-side pressure as measured and the low-side pressure as measured, calculating a plurality of expansion valve mass flow rate values of the refrigerant through the plurality of electronic expansion valves based on the sensed delta value and the plurality of expansion valve positions, calculating a compressor mass flow rate value of the refrigerant through the compressor, and performing a low-side remedial action where a sum of the plurality of expansion valve mass flow rate values deviates from the compressor mass flow rate value by greater than a low-side threshold value.

In one or more embodiments, the method includes measuring a second high-side temperature of the refrigerant upstream of the plurality of electronic expansion valves, and measuring a low-side temperature of the refrigerant proximate the inlet port of the compressor. The plurality of expansion valve mass flow rate values is based on the second high-side temperature. The compressor mass flow rate value is based on the low-side temperature.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure generally provide for thermal system monitoring of a performance of a refrigerant flow through a refrigerant system. The performance is monitored utilizing refrigerant mass flow rate calculations through a compressor, multiple electronic expansion valves (EXVs), and multiple refrigerant flow valves (RFVs) using multiple inputs parameters and conditions. The refrigerant system includes a processor, an electronic high voltage compressor, and a refrigerant loop. The refrigerant loop includes multiple pressure sensors, multiple temperature sensors, the electronic expansion valves, and the refrigerant flow valves that regulate a refrigerant flow in multiple branches of the loop. Where the mass flow rate calculations indicate excessive refrigerant outflow or inflow from a controlled volume, the processor sets a diagnostic fault code and issues a notification. The diagnostic fault code may help identify where the potential issues are within the refrigerant loop. The refrigerant system and/or method may be implemented in a vehicle. The notification may be presented to a driver to the vehicle.

Figure 1:
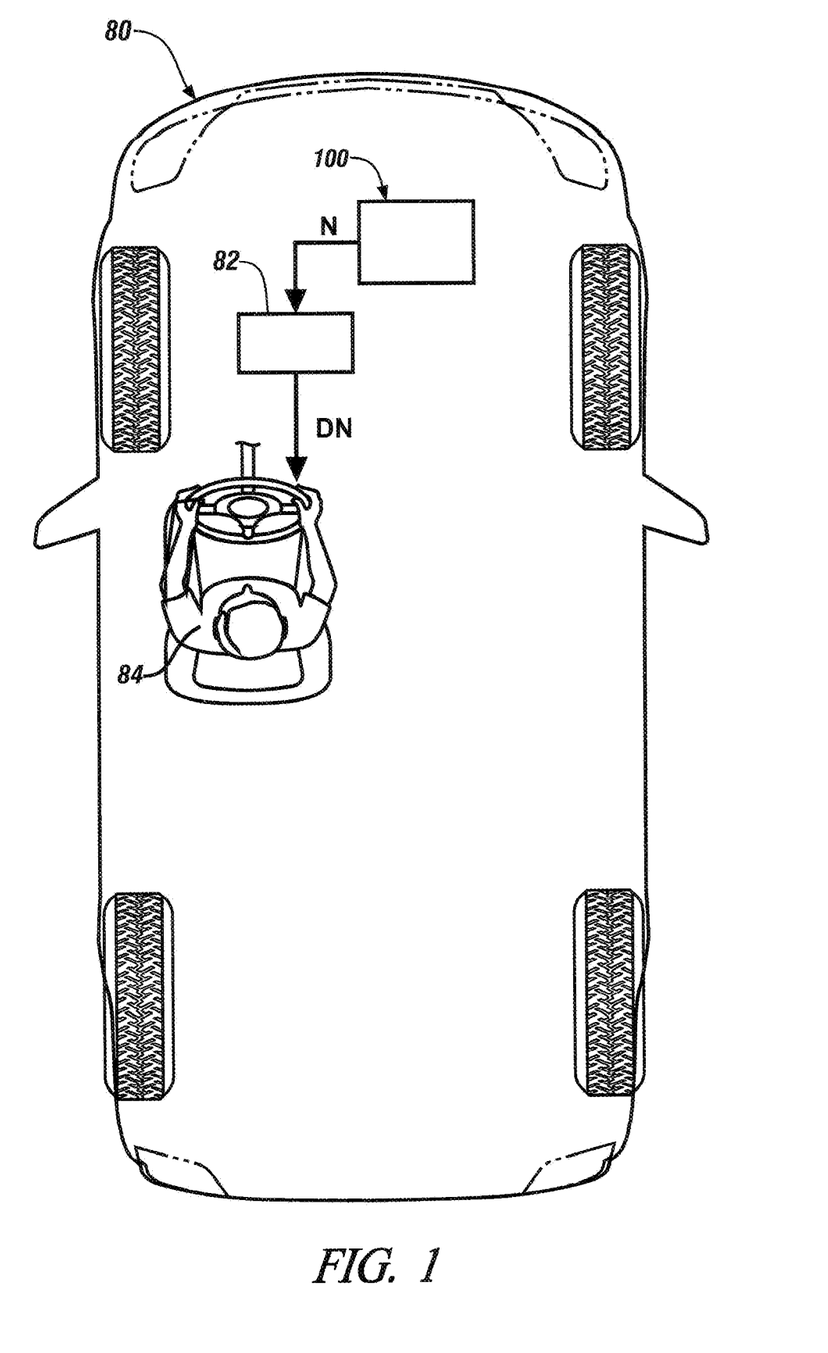
FIG. 1 is a schematic diagram illustrating a context of a vehicle in accordance with one or more exemplary embodiments.

Referring to FIG. 1, a schematic diagram illustrating a context of a vehicle 80 is shown in accordance with one or more exemplary embodiments. The vehicle 80 includes a display 82 and a refrigerant system 100. The vehicle 80 may be occupied by a driver 84. The driver 84 and the display 82 are disposed in a cabin of the vehicle 80.

The vehicle 80 implements as an automobile (or car). In various embodiments, the vehicle 80 may include, but is not limited to, a passenger vehicle, a truck, an autonomous vehicle, a gas-powered vehicle, an electric-powered vehicle, a hybrid vehicle and/or a motorcycle. Other types of vehicles 80 may be implemented to meet the design criteria of a particular application.

The display 82 implements a console display mounted inside the vehicle 80. The display 82 is operational to provide visual and/or acoustic information to the driver 84. The display 82 is in electronic communication with the refrigerant system 100 to receive a notification signal (N). The display 82 may convert the notification signal N into a driver notification signal (DN). The driver notification signal DN may be a visual signal, an acoustic signal, or both. The notification signal N and the driver notification signal DN generally inform the driver 84 that an issue has been detected in the refrigerant system 100.

The driver 84 is a user of the vehicle 80. The driver 84 is operational to control a variety of functions in the vehicle 80 manually. In various embodiments, the driver 84 may control steering, acceleration, braking, and levels of cooling available in the crew compartment. The driver 84 may take one or more actions (e.g., stop the vehicle 80) in response to receiving the driver notification signal DN.

The refrigerant system 100 is implemented as a closed-loop heating and cooling system. The refrigerant system 100 is operational to provide a refrigerant under pressure to multiple branches on a high-pressure side of the refrigerant system, and multiple branches on a low-pressure side of the refrigerant system. The refrigerant system 100 generally performs real-time diagnostics to verify a health of the system. Upon detection of an issue within the refrigerant system 100, the notification signal N may be asserted to the display 82.

The diagnostics performed by the refrigerant system 100 generally include running diagnostics on the high-pressure side of the refrigerant system 100, and running diagnostics on the low-pressure side of the refrigerant system 100. The high-pressure side diagnostics include, but are not limited to, measuring a first high-side pressure of a refrigerant with a first high-side pressure sensor in fluid communication with an outlet port of a compressor, measuring a second high-side pressure of the refrigerant with a second high-side pressure sensor in fluid communication with an inlet port of the compressor, controlling flow valve positions of refrigerant flow valves, calculating a high-side delta value as a difference between the first high-side pressure as measured and the second high-side pressure as measured, calculating an expected delta value between the first high-side pressure and the second high-side pressure based on a ratio of a low-side density of the refrigerant at the inlet port of the compressor to the plurality of flow valve positions, and performing a high-side remedial action where the high-side delta value deviates from the expected delta value by greater than a high-side threshold value. In various embodiments, the refrigerant system 100 examines multiple datapoints and applies a fault maturation strategy, such as X of Y, before taking a high side remedial action.

The low-pressure side diagnostics include, but are not limited to, calculating a sensed delta value as a difference between the second high-side pressure as measured and a low-side pressure as measured, calculating expansion valve mass flow rate values of the refrigerant through electronic expansion valves based on the sensed delta value and positions of the electronic expansion valves, calculating a compressor mass flow rate value of the refrigerant through the compressor, and performing a low-side remedial action where a sum of the expansion valve mass flow rate values deviates from the compressor mass flow rate value by greater than a low-side threshold value. The high-side remedial action and/or the low-side remedial action may include closing valves where leaks are suspected and/or stopping the compressor to remove pressure on the refrigerant. In various embodiments, the refrigerant system 100 examines multiple datapoints and applies a fault maturation strategy, such as X of Y, before taking a low side remedial action.

Figure 2:
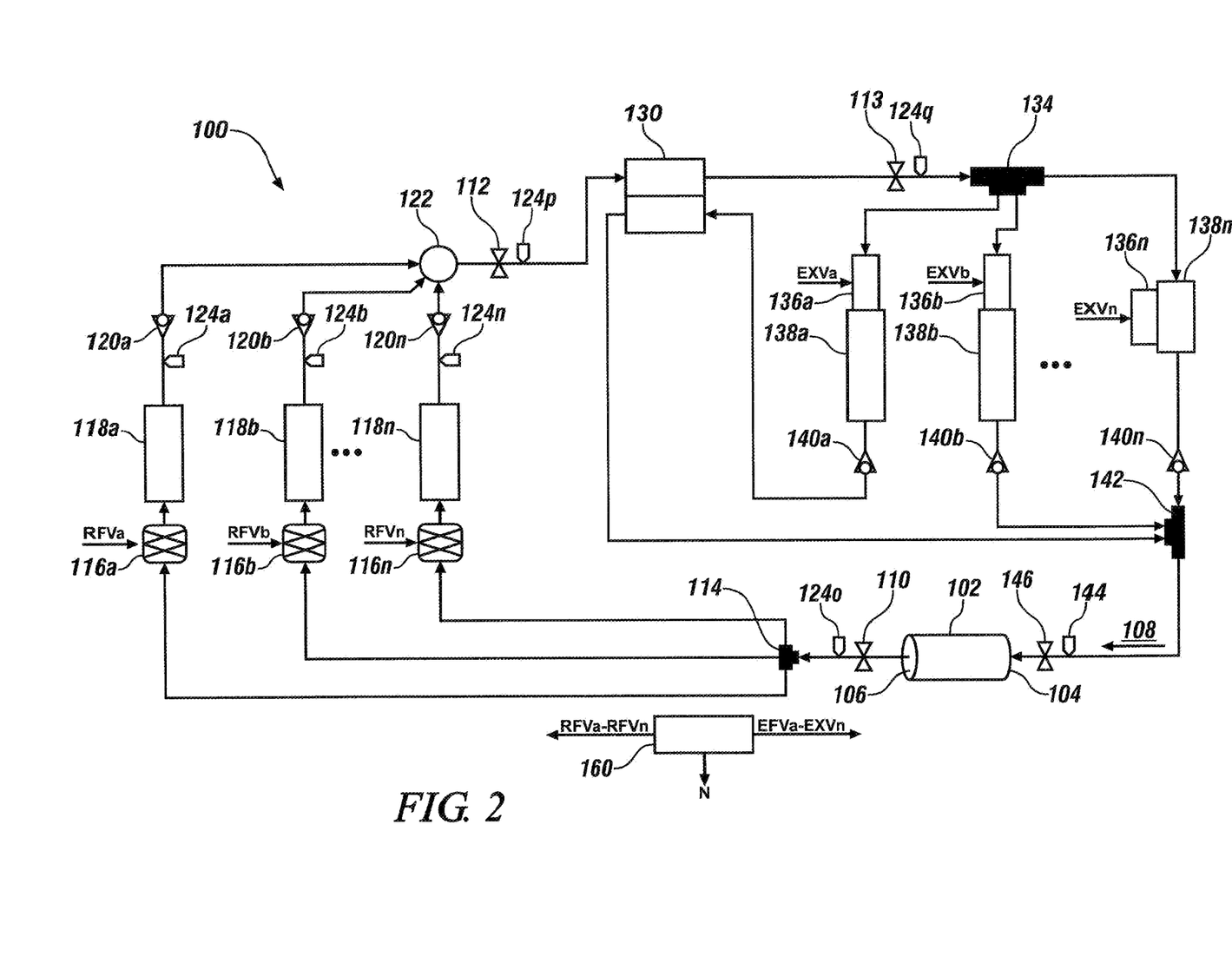
FIG. 2 is a schematic diagram of a refrigerant system in accordance with one or more exemplary embodiments.

Referring to FIG. 2, a schematic diagram of an example implementation of the refrigerant system 100 is shown in accordance with one or more exemplary embodiments. The refrigerant system 100 includes a compressor 102, a refrigerant 108, a first high-side pressure sensor 110, a second high-side pressure sensor 112, a third high-side pressure sensor 113, one or more high-side splitters 114 (one illustrated), multiple refrigerant flow valves 116a-116n, multiple condensers 118a-118n, multiple high-side check valves 120a-120n, one or more high-side combiners 122 (one illustrated), and multiple high-side temperature sensors 124a-124q. The refrigerant system 100 also includes an integrated heat exchanger 130, one or more low-side splitters 134 (one illustrated), multiple electronic expansion valves 136a-136n (EXVA-EXVN), multiple evaporators 138a-138n, multiple low-side check valves 140a-140n, one or more low-side combiners 142 (one illustrated), a low-side temperature sensor 144, a low-side pressure sensor 146, and processor 160. The compressor 102 has an inlet port 104 and an outlet port 106. A temperature sensor among the sensors 124a-124q may be referred to as a first high-side temperature sensor 124o. A temperature sensor among the sensors 124a-124q may be referred to as a second high-side temperature sensor 124p. A temperature sensor among the sensors 124a-124q may be referred to as a third high-side temperature sensor 124q.

Multiple refrigerant flow valve signals (RFVa-RFVn) may be generated by the processor 160 and received by respective refrigerant flow valves 116a-116n. Each refrigerant flow valve signal RFVa-RFVn conveys control information that determines a degree to which a corresponding refrigerant flow value 116a-116n is open. Multiple electronic expansion valve signals (EXVa-EXVn) may be generated by the processor 160 and received by respective electronic expansion valves 136a-136n. Each electronic expansion valve signal EXVa-EXVn conveys control information that determines a degree to which a corresponding electronic expansion valve 136a-136n is open. The notification signal N is generated by the processor 160 and transferred to the display 82 (see FIG. 1).

The compressor 102 implements an electronic high voltage compressor. The compressor 102 is operational to compress the refrigerant 108 received at the inlet port 104 to a higher pressure at the outlet port 106. In various embodiments, the compressor 102 may be powered by hydraulic pressure or a rotating mechanical shaft.

The refrigerant 108 implements a cooling fluid. The refrigerant 108 is operational to transfer excessive heat from the evaporators 138a-138n to the condensers 118a-118n where the heat may be dissipated into ambient air.

The first high-side pressure sensor 110, the second high-side pressure sensor 112, and the third high-side pressure sensor 113 implement pressure sensors located in the high-pressure side of the refrigerant system 100. The first high-side pressure sensor 110 is generally disposed near and is in fluid communication with the outlet port 106 of the compressor. The second high-side pressure sensor 112 is disposed further along in the high-pressure side of the refrigerant system 100 before the integrated heat exchanger 130. The third high-side pressure sensor 113 is disposed at a far end of the high-pressure side of the refrigerant system 100 after the integrated heat exchanger 130. In various embodiments, the second high-side pressure sensor 112 may be eliminated and the third high-side pressure sensor 113 used instead. The second high-side pressure sensor 112 and the third high-side pressure sensor 113 are in fluid communication with the inlet port 104 of the compressor through the low-pressure side of the refrigerant system 100.

The high-side splitter 114 is operational to route the refrigerant 108 received from the compressor 102 into several output branches. Each output branch is coupled by a respective line to one of the refrigerant flow valves 116a-116n.

Each refrigerant flow valve 116a-116n implements an electronically variable valve. Positions of the refrigerant flow valves 116a-116n are controlled by the processor 160 through the refrigerant flow valve signals RFVa-RFVn. The valve positions may range from fully closed to fully open.

The condensers 118a-118n implement heat exchangers. The condensers 118a-118n are coupled downstream of the refrigerant flow valves 116a-116n through respective lines. The condensers 118a-118n are operational to transfer heat from the refrigerant 108 to an ambient air. The ambient air may be inside the vehicle 80 and/or outside the vehicle 80.

The high-side check valves 120a-120n are operational to limit the flow of the refrigerant 108 to a specific direction. The high-side check valves 120a-120n are generally disposed downstream of the condensers 118a-118n and are oriented to allow the refrigerant 108 to flow away from the condensers 118a-118n. A leak in a condenser 118a-118n may be isolated by commanding the corresponding refrigerant flow valve 116a-116n to close thereby reducing the pressure of the refrigerant 108 in the leaking condenser 118a-118n. The lower pressure on the upstream side of the corresponding high-side check valve 120a-120n relative to the downstream side generally causes the corresponding high-side check valve 120a-120n to close, thereby containing the leak.

The high-side combiner 122 is operational to combine the refrigerant 108 received from the several branches into a single line. Each input branch is coupled by a respective line to one of the high-side check valves 120a-120n. An output branch of the high-side combiner 122 is coupled by a line to the integrated heat exchanger 130.

The high-side temperature sensors 124a-124p implement thermal sensors. The high-side temperature sensors 124a-124n measure the temperature of the refrigerant 108 flowing through the condensers 118a-118n. The first high-side temperature sensor 124o measures the temperature of the refrigerant 108 leaving the compressor 102 and entering the high-pressure side of the refrigerant system 100. The second high-side temperature sensor 124p measures the temperature of the refrigerant 108 leaving the high-pressure side of the refrigerant system 100 and entering the integrated heat exchanger 130.

The integrated heat exchanger 130 is operational to exchange heat between the refrigerant 108 leaving the high-pressure side with the refrigerant 108 leaving at least one branch of the low-pressure side of the refrigerant system 100.

The low-side splitter 134 is operational to split the refrigerant 108 received from the integrated heat exchanger 130 into several output branches. Each output branch is coupled by a line to a respective one of the electronic expansion valves 136a-136n.

Each electronic expansion valve 136a-136n implements an electronically variable valve. Positions of the electronic expansion valves 136a-136n are controlled by the processor 160 through the expansion valve signals EXVa-EXVn. The valve positions may range from fully closed to fully open.

The evaporators 138a-138n implement heat exchangers or chillers. The evaporators 138a-138n are coupled downstream of the electronic expansion valves 136a-136n by respective lines. The evaporators 138a-138n are operational to transfer heat from a surrounding air into the refrigerant 108. The surrounding air generally resides inside the vehicle 80.

The low-side check valves 140a-140n are operational to limit the flow of the refrigerant 108 to a specific direction. The low-side check valves 140a-140n are generally disposed downstream of the evaporators 138a-138n and are oriented to allow the refrigerant 108 to flow away from the evaporators 138a-138n. A leak in an evaporator 138a-138n may be isolated by commanding the corresponding electronic expansion valve 136a-136n to close thereby reducing the pressure of the refrigerant 108 in the leaking evaporator 138a-138n. The lower pressure on the upstream side of the corresponding low-side check valve 140a-140n relative to the downstream side generally causes the corresponding low-side check valve 140a-140n to close, thereby containing the leak.

The low-side combiner 142 is operational to combine the refrigerant 108 received from the several branches into a single line. Each input branch is coupled by a respective line to one of the low-side check valves 140a-140n. An output branch of the low-side combiner 142 is coupled by a line to the inlet port 104 of the compressor 102.

The low-side temperature sensor 144 implements a thermal sensor. The low-side temperature sensor 144 measures the temperature of the refrigerant 108 leaving the low-pressure side of the refrigerant system 100 and entering the compressor 102.

The processor 160 implements one or more processors (one illustrated). The processor 160 is operational to perform real-time diagnostics on the refrigerant system 100 while the compressor 102 is operating. The processor 160 is further operational to control the various valves through the valve signals RFVa-RFVn and EXVa-EXVn. Upon detection of an issue with the refrigerant system 100, the processor 160 asserts the notification signal N to the display 82, and the display 82 generates the driver notification signal DN to inform the driver 84.

Figure 3:
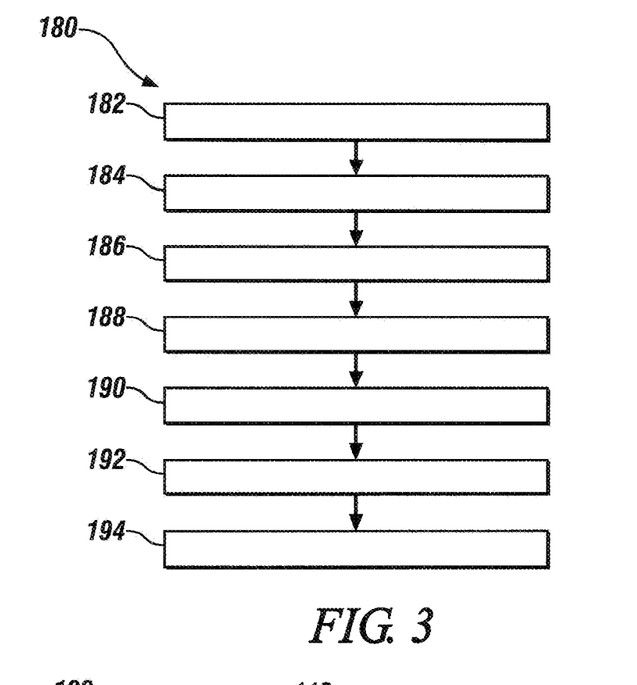
FIG. 3 is a flow diagram of a method for monitoring in the refrigerant system in accordance with one or more exemplary embodiments.

Referring to FIG. 3, a flow diagram of an example implementation of a method 180 for monitoring the refrigerant system 100 is shown in accordance with one or more exemplary embodiments. The method (or process) 180 is implemented by the refrigerant system 100 and the display 82. The method 180 includes steps 182 to 194, as shown. The sequence of steps is shown as a representative example. Other step orders may be implemented to meet the criteria of a particular application.

In the step 182, the compressor 102 may receive the refrigerant 108 at a low pressure through the inlet port 104 and subsequently compress the refrigerant 108 to a high pressure. The compressed refrigerant 108 is presented at the high pressure by the compressor 102 at the outlet port 106 in the step 184. The processor 160 controls the flow valve positions of the refrigerant flow valves 116a-116n in the step 186 to establish an intended flow through the various branches on the high-pressure side. The high-pressure refrigerant 108 flowing through the opened refrigerant flow valves 116a-116n pushes the high-side check valves 120a-120b open in the step 188.

The processor 160 controls the expansion valve positions of the electronic expansion valves 136a-136n in the step 190 to establish an intended flow through the various branches on the low-pressure side. The pressure of the refrigerant 108 flowing into the evaporators 138a-138b pushes the low-side check valves 140a-140b open in the step 192. Monitoring of the temperature and the pressure of the refrigerant 108 at various locations in the refrigerant system 100 is performed in the step 194 by the processor 160. Where an abnormal situation is found in the refrigerant system 100 by the processor 160, the processor 160 may take corrective action and/or notification action as part of the step 194.

Figure 4:
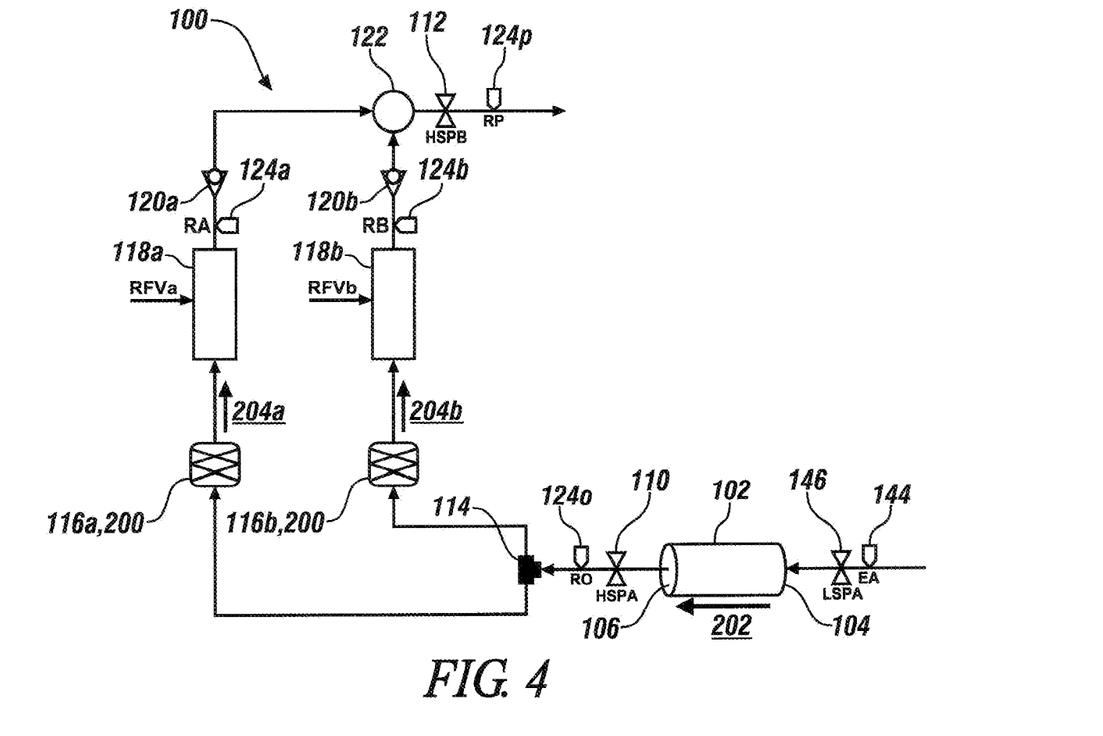
FIG. 4 is a schematic diagram of a high-pressure side of the refrigerant system in accordance with one or more exemplary embodiments.

Referring to FIG. 4, a schematic diagram of an example embodiment of the high-pressure side of the refrigerant system 100 is shown in accordance with one or more exemplary embodiments. Two branches are illustrated in the example. For purposes of the following explanations, the low-side pressure sensor 146 and the low-side temperature sensor 144 are included in the figure.

The compressor 102 generates a compressor mass flow rate value ($m_{COMP}$) 202 of the refrigerant 108. The first high-side pressure sensor 110 measures a first high-side pressure value (HSPA) of the refrigerant 108 leaving the compressor 102. The first high-side temperature sensor 124o measures a first high-side temperature value (RO) of the refrigerant 108 leaving the compressor 102. The second high-side pressure sensor 112 measures a second high-side pressure value (HSPB) of the refrigerant 108 after the high-side combiner 122. The second high-side temperature sensor 124p measures a second high-side temperature value (RP) of the refrigerant 108 after the high-side combiner 122. The low-side pressure sensor 146 measures a low-side pressure value (LSPA) of the refrigerant 108 entering the compressor 102. The low-side temperature sensor 144 measures a low-side temperature value (EA) of the refrigerant 108 entering the compressor 102.

A first branch includes the first refrigerant flow valve 116a, the first condenser 118a, the first high-side check valve 120a, and a high-side temperature sensor 124a. A first flow valve mass flow rate value ($m_{RFVA}$) 204a of the refrigerant 108 flows through the first branch based on a flow valve position 200 of the first refrigerant flow valve 116a. The high-side temperature sensor 124a measures a temperature value (RA) of the refrigerant 108 in the first branch.

The second branch includes the second refrigerant flow valve 116b, the second condenser 118b, the second high-side check valve 120b, and another high-side temperature sensor 124b. A second flow valve mass flow rate value ($m_{RFVN}$) 204b of the refrigerant 108 flows through the second branch based on a flow valve position 200 of the second refrigerant flow valve 116b. The high-side temperature sensor 124b measures a temperature value (RB) of the refrigerant 108 in the second branch.

In various embodiments where additional branches are implemented, the Nth branch would include the Nth refrigerant flow valve 116n, and the Nth temperature sensor 124n. An Nth flow valve mass flow rate value ($m_{RFVN}$) 204n would flow through the Nth branch based on a flow valve position 200 of the Nth refrigerant flow valve 116n.

An expected pressure delta (or difference) between the two high-side pressure values HSPA and HSPB may be calculated by the processor 160 using a conservation of mass equation on the physical boundaries defined by the inlet of the compressor 102 and the outlets of the refrigerant flow valves 116a-116n (where n=b in the figure). The conservation of mass equation is provided by equation 1 as follows:

$$0 = \Sigma m_{TOTAL} = m_{COMP} - m_{RFVA} - \ldots - m_{RFVN} \qquad \text{Eq. (1)}$$

The instantaneous compressor mass flow rate value wow through the compressor 102 is calculated using a fixed volume equation. The fixed volume equation is provided by equation 2 as follows:

$$m_{COMP} = \eta_{vol} C_{COMP} \eta \rho_{LSDA} \qquad \text{Eq. (2)}$$

Where:

$\eta_{vol}$ is an approximate compressor volumetric efficiency;

$C_{COMP}$ is a volumetric displacement of the compressor 102 for one revolution;

$\eta$ is a compressor speed; and $\rho_{LSDA}$ is a low-side density of the refrigerant 108 at the low-side temperature sensor 144 and is dependent on the low-side temperature value EA.

A sum of the flow valve mass flow rate values ($M_{RFVA}$ to $M_{RFVN}$) through the refrigerant flow valves 116a-116n is calculated using a pressure differential across an orifice equation, as provided by equation 3 as follows:

$$M_{RFVA} + \ldots + M_{RFVN} = (C_{RFVA} + \ldots + C_{RFVN}) \sqrt{\rho_{HSDA}(P_{HSPA} - P_{HSPB})} \qquad \text{Eq. (3)}$$

Where:

$C_{RFVA}, \ldots, C_{RFVN}$ are refrigerant flow valve flow coefficient constants that are functions of the flow valve positions 200.

$\rho_{HSDA}$ is the high-side density of the refrigerant 108 at first high-side temperature sensor 124o and is dependent on the first high-side temperature RO.

$P_{HSPA}$ is the high-side pressure of the refrigerant 108 at the first high-side pressure sensor 110.

$P_{HSPB}$ is the high-side pressure of the refrigerant 108 at the second high-side pressure sensor 112.

Substituting $\Delta P = P_{HSPA} - P_{HSPB}$ and solving the system of equations for expected pressure delta value $\Delta P$ is provided by equation 4 as follows:

$$\Delta P = \left( \frac{\eta_{vol} C_{COMP} \eta \rho_{LSDA}}{c_{RFVA} + \ldots + c_{RFVN}} \right)^2 \frac{1}{\rho_{HSDA}} \qquad \text{Eq. (4)}$$

The diagnostic subsequently compares the expected (calculated) pressure delta values between HSPA and HSPB with the sensed (measured) pressure delta value between HSPA and HSPB. Where the measured pressure delta value deviates greater than a high-side threshold value (HSThr) away from the expected pressure delta value (e.g., the deviation may be above or below the expected pressure delta value) for x of y samples, the processor 160 may take corrective action and/or raise the notification signal N to alert the driver 84.

Figure 5:
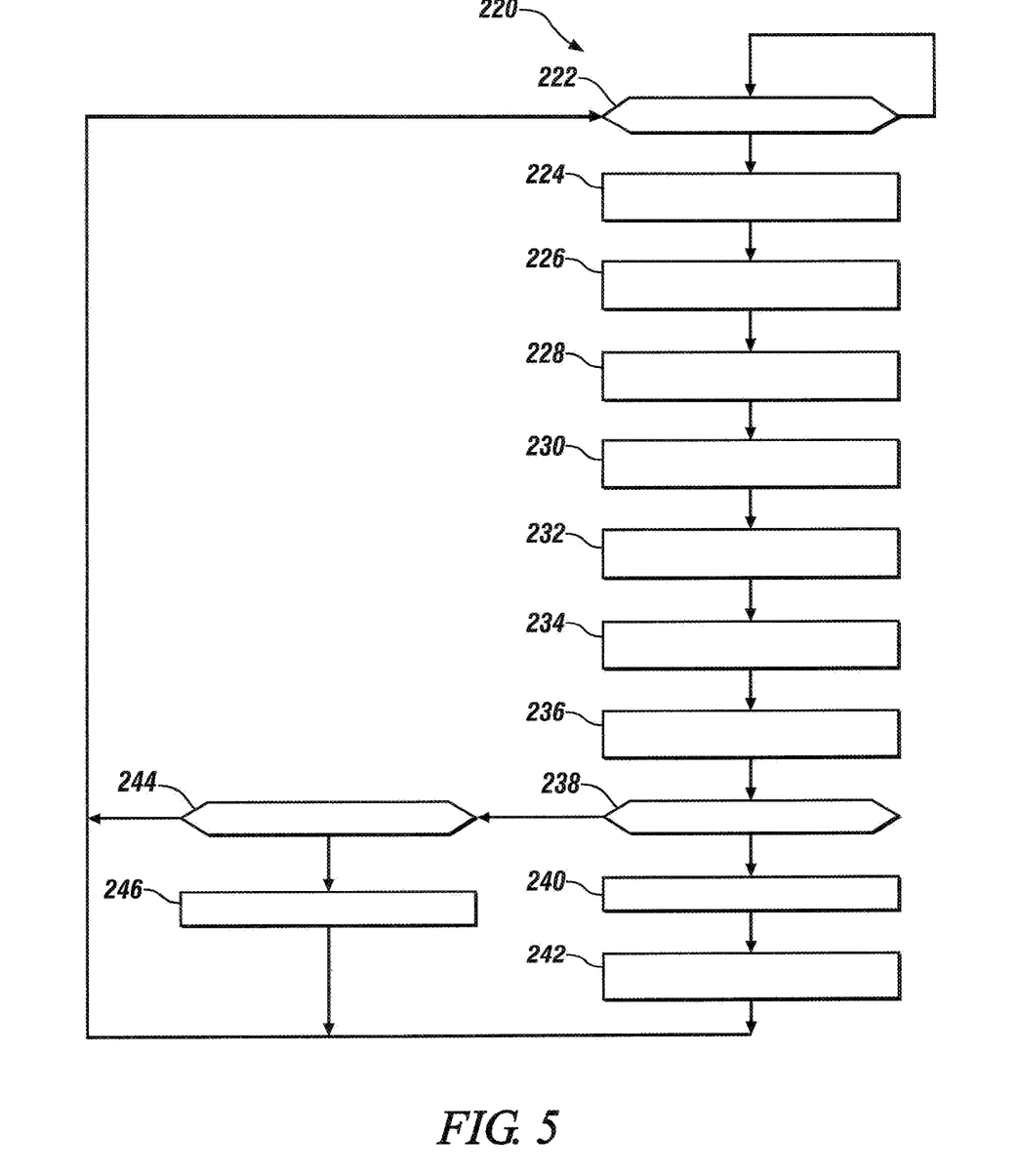
FIG. 5 is a flow diagram of a method for high-pressure side monitoring of the refrigerant system in accordance with one or more exemplary embodiments.

Referring to FIG. 5, a flow diagram of an example implementation of a method 220 for high-pressure side monitoring of the refrigerant system 100 is shown in accordance with one or more exemplary embodiments. The method (or process) 220 is implemented by the refrigerant system 100 and the display 82. The method 220 includes steps 222 to 246, as shown. The sequence of steps is shown as a representative example. Other step orders may be implemented to meet the criteria of a particular application.

In the step 222, the processor 160 checks to determine if enabling criteria are satisfied. The enabling criteria may include the vehicle 80 being powered on, the compressor 102 is turning, and the like. If the enabling criteria are not satisfied, the method 220 may return to the step 222 until the criteria are satisfied. Once the criteria are satisfied, the first high-side pressure may be measured in the step 224. The second high-side pressure may be measured in the step 226. The low-side pressure is measured in the step 228. The first high-side temperature is measured in the step 230. The low-side temperature is measured in the step 232.

In the step 234, the processor 160 calculates the high-side delta value as measured. The expected delta value is calculated by the processor 160 in the step 236. The processor subsequently checks if one or more failure conditions have been satisfied in the step 238. The failure conditions may include, but are not limited to, the measured high-side delta value being different from the expected high-side different value by greater than the high-side threshold value HSThr, one or more of the high-side pressure sensors 110-113 reporting an out-of-range value or an irrational value, one or more of the temperature sensors 124*o*, 124*p*, 124*q* and/or 144 reporting an out-of-range value or an irrational value, a degradation of the compressor, a degradation of one or more refrigerant flow valves, and/or physical obstructions in the refrigerant. If one or more failure conditions are satisfied in the step 238, the processor 160 sets corresponding fault codes in the diagnostics and reports the issue to the driver 84 by asserting the notification signal N in the step 240. The processor 160 may take one or more high-side remedial corrective actions in the step 242. The high-side remedial actions may vary, but usually includes notifying the driver 84 with the display 82 and/or shutting down the compressor 102. The method 220 subsequently returns to the step 222.

Where no failures have been detected in the step 238, the processor 160 checks if a pass condition exists in the step 244. If the pass condition exists, the processor 160 reports the pass in the diagnostics in the step 246. Thereafter, the method 220 returns to the step 222. If the pass condition does not exist in the step 244, the method 220 returns directly to the step 222 without reporting to the diagnostics.

Figure 6:
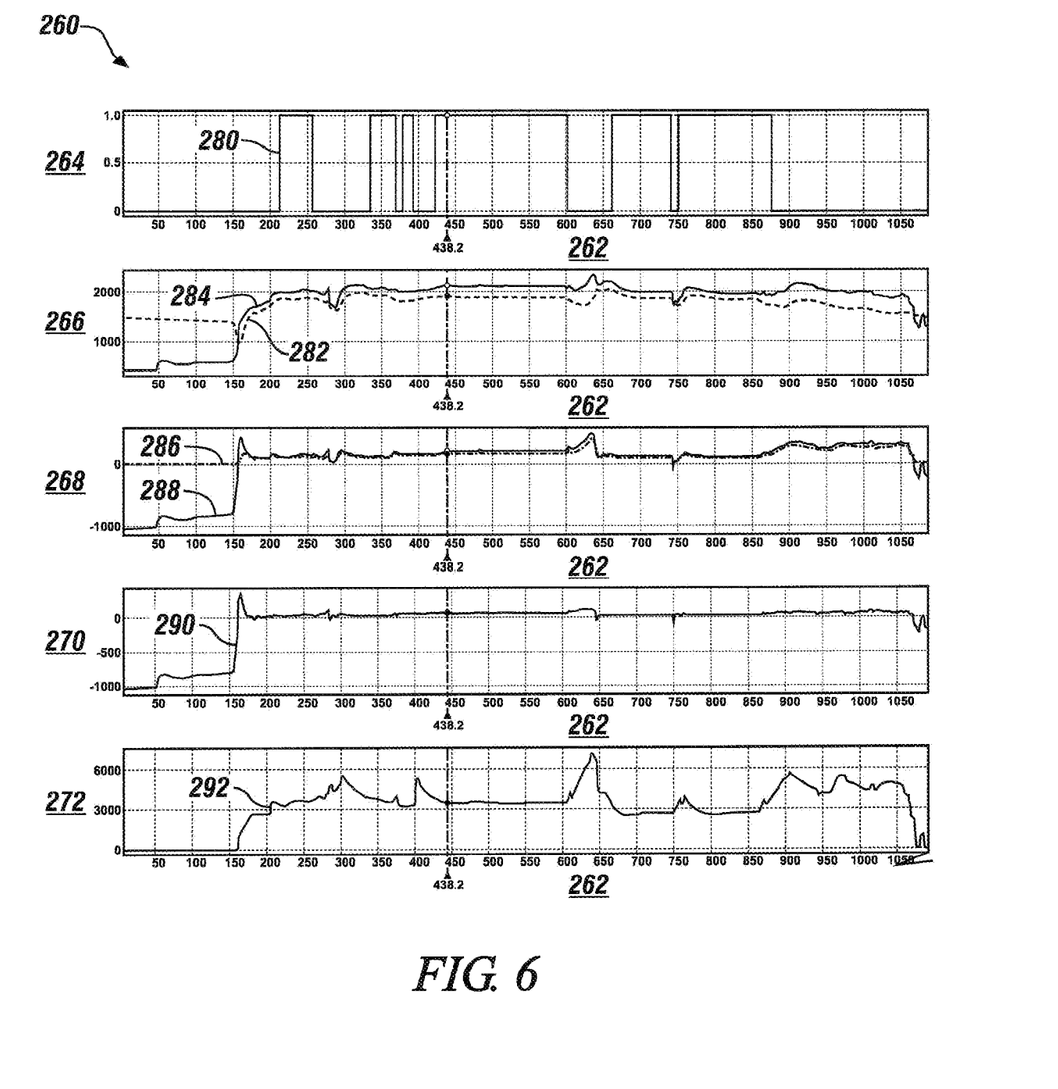
FIG. 6 is a graph of test data where a high-pressure side diagnostic is expected to pass in accordance with one or more exemplary embodiments.

Referring to FIG. 6, a graph 260 of test data where the high-pressure side diagnostic is expected to pass is shown in accordance with one or more exemplary embodiments. The test data was collected from engineering vehicles with normal parts.

The graph 260 has multiple vertical axes and a common horizontal axis 262. The axis 262 illustrates time in units of seconds. A vertical axis 264 illustrates an enable/disable condition of the high-pressure side diagnostics. A value of 1 indicates that the high-pressure side diagnostic is enabled. A value of 0 indicates that the high-pressure side diagnostic is disabled. A curve 280 shows the enabled/disabled condition of the high-pressure side diagnostics as a function of time. While the high-pressure side diagnostic is enabled, the processor 160 compares the sensed pressure delta value to the predicted pressure delta value.

A vertical axis 266 illustrates a range of the sensed (or measured) pressure values in units of kilopascals. A curve 282 illustrates the second high-side pressure HSPB. A curve 284 illustrates the first high-side pressure HSPA. Since the parts used in the test were normal parts, the curves 282 and the 284 generally track each other while the compressor 102 is operating normally.

A vertical axis 268 illustrates a range of pressure delta values in units of kilopascals. A curve 286 shows a predicted pressure delta value. A curve 288 is a sensed pressure delta value. The pressure delta values shown by curves 286 and 288 generally track closely while the high-side diagnostic is enabled. The sensed pressure value would deviate significantly from the predicted pressure value (resulting in a large delta value) in cases where a pressure sensor fails and/or a physical obstruction exists in the lines.

A vertical axis 270 illustrates the range of pressure delta values. A curve 290 shows that a maximum delta value between the sensed pressure delta value and the predicted pressure delta value is approximately 50 kilopascals while the high-pressure side diagnostic is enabled.

A vertical axis 272 illustrates a range of speed for the compressor 102 in units of revolutions per minute. A curve 292 shows when the compressor 102 is running.

Figure 7:
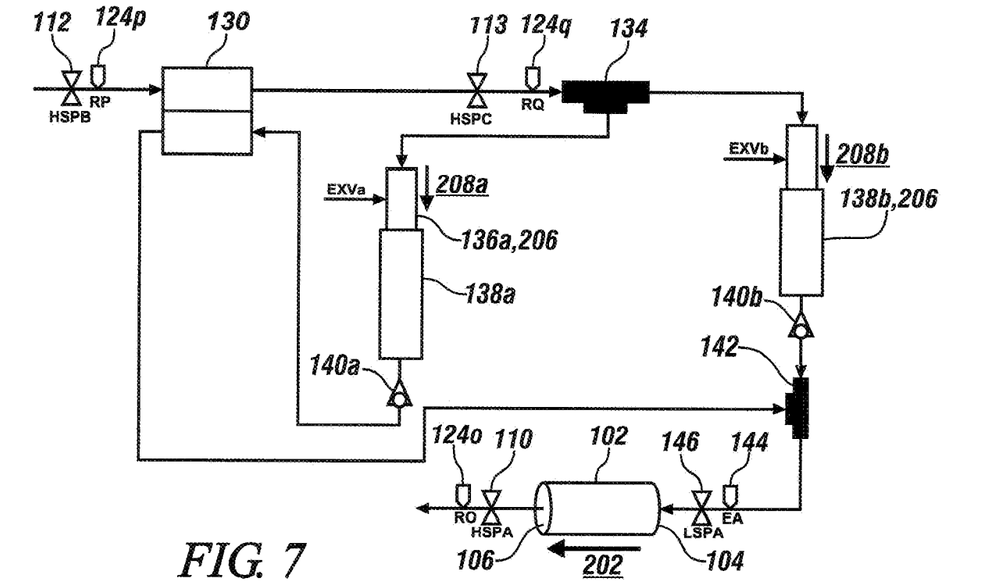
FIG. 7 is schematic diagram of a low-pressure side of the refrigerant system in accordance with one or more exemplary embodiments.

Referring to FIG. 7, a schematic diagram of an example embodiment of the low-pressure side of the refrigerant system 100 is shown in accordance with one or more exemplary embodiments. Two branches are illustrated in the example. For purposes of the following explanations, the high-side pressure sensors 110-113 and the high-side temperature sensors 124*o*-124*q* are included in the figure.

The compressor 102 generates the compressor mass flow rate value $m_{COMP}$ 202 of the refrigerant 108. The first high-side pressure sensor 110 measures the first high-side pressure value HSPA of the refrigerant 108 leaving the compressor 102. The first high-side temperature sensor 124*o* measures a first high-side temperature value RO of the refrigerant 108 leaving the compressor 102. The second high-side pressure sensor 112 measures the second high-side pressure value HSPB of the refrigerant 108 after the high-side combiner 122. The second high-side temperature sensor 124*p* measures the second high-side temperature value RP of the refrigerant 108 after the high-side combiner 122. The third high-side pressure sensor 113 measures a third high-side pressure value (HSPC) after the integrated heat exchanger 130. The third high-side temperature sensor 124*q* measures a third high-side temperature value (RQ) of the refrigerant 108 after the integrated heat exchanger 130. The low-side pressure sensor 146 measures the low-side pressure value LSPA of the refrigerant 108 entering the compressor 102. The low-side temperature sensor 144 measures the low-side temperature value EA of the refrigerant 108 entering the compressor 102.

A first branch includes the first electronic expansion valve 136*a*, the first evaporator 138*a*, and the first low-side check valve 140*a*. A first expansion valve mass flow rate value $(m_{EXVA})$ 208*a* of the refrigerant 108 flows through the first branch based on an expansion valve position 206 of the first electronic expansion valve 136*a*.

The second branch includes the second electronic expansion valve 136*b*, the second evaporator 138*b*, and the second low-side check valve 140*b*. A second first expansion valve mass flow rate value $(m_{EXVB})$ 208*b* of the refrigerant 108 flows through the second branch based on an expansion valve position 206 of the second electronic expansion valve 136b.

An approximate conservation of mass equation is applied across the physical boundary defined by the electronic expansion valve outlets and the compressor inlet. The approximate conservation of mass equation is provided by equation 5 as follows:

$$0 \cong \Sigma m_{TOTAL} = m_{COMP} - (m_{EXVA} + \ldots + m_{EXVN}) \quad \text{Eq. (5)}$$

The instantaneous mass flow rate value wow through the compressor 102 is calculated using a fixed volume equation 6, provided as follows:

$$m_{COMP} = \eta_{VOL} C_{COMP} \eta \rho_{LSRP} \quad \text{Eq. (6)}$$

Where:

$\eta_{vol}$ is an approximate compressor volumetric efficiency;

$c_{comp}$ is a volumetric displacement of the compressor 102 for one revolution;

η is the compressor speed; and $\rho_{LSDA}$ is the low-side density of the refrigerant 108 at the low-side temperature sensor 144 and is dependent on the low-side temperature value EA.

A sum of the instantaneous mass flow rate values through the electronic expansion valves 136a-136b is calculated using a pressure differential across an orifice equation per equation 7, as follows:

$$\frac{m_{EXVA} + \ldots + m_{EXVN} = (c_{EXVA} + \ldots + c_{EXVN})}{\sqrt{\rho_{HSDB}(P_{HSPB} - P_{LSPA})}} \quad \text{Eq (7)}$$

Where:

$C_{EXVA}, \ldots, C_{EXVN}$ are electronic expansion value flow coefficient constants that are functions of the expansion value position 206;

$\rho_{HSDB}$ is the high-side density of the refrigerant 108 at the second high-side temperature sensor 124p and is dependent on the second high-side temperature RP.

$P_{HSPB}$ is the high-side pressure of the refrigerant 108 at the second high-side pressure sensor 112; and $P_{LSPA}$ is the low-side pressure of the refrigerant 108 at the low-side pressure sensor 146.

Due to refrigerant compressibility and phase change, the approximate conservation of mass equation 5 may be inaccurate at a given instant. Therefore, the inaccuracies may be smoothed out by integrating the instantaneous mass flow rate values over a period, such as a few seconds or a few minutes.

Figure 8:
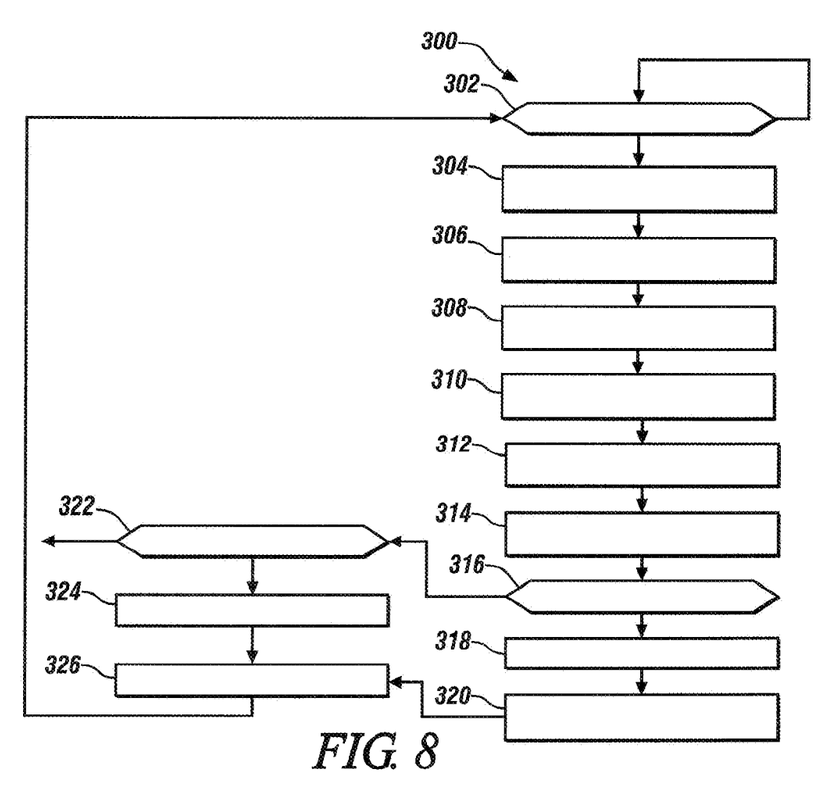
FIG. 8 is a flow diagram of a method for monitoring the low-pressure side of the refrigerant system in accordance with one or more exemplary embodiments.

Referring to FIG. 8, a flow diagram of an example implementation of a method 300 for monitoring the low-pressure side of the refrigerant system 100 is shown in accordance with one or more exemplary embodiments. The method (or process) 300 may be implemented by the refrigerant system 100 and the display 82. The method 300 includes steps 302 to 326, as shown. The sequence of steps is shown as a representative example. Other step orders may be implemented to meet the criteria of a particular application.

In the step 302, the processor 160 checks to determine if enable criteria are satisfied. The enabling criteria may include the vehicle 80 being powered, the compressor 102 is turning, and the like. If the enabling criteria are not satisfied, the method 300 may return to the step 302 until the criteria are satisfied. Once the criteria are satisfied, the processor 160 may calculate the instantaneous mass flow rate values in the step 304. The instantaneous mass flow rate values are integrated in the step 306. In the step 308, the processor 160 calculates a sensed delta value as another difference between the second high-side pressure as measured and the low-side pressure as measured.

In the step 310, the expansion valve mass flow rate values are calculated by the processor 160. The compressor mass flow rate value is calculated in the step 312. The sum of the expansion valve mass flow rate values is calculated in the step 314.

In the step 316, the processor 160 checks if one or more failure conditions have been satisfied. The failure conditions may include, but are not limited to, the sum of the expansion valve mass flow rate values being different from the compressor mass flow rate value by greater than the low-side threshold value LSThr, one or more of the high-side pressure sensors 110-113 and/or the low-side pressure sensor 146 reporting an out-of-range value or an irrational value, one or more of the temperature sensors 124o, 124p, 124q and/or 144 reporting an out-of-range value or an irrational value, a degradation of the compressor, a degradation of one or more of the expansion valves, and/or physical obstructions in the refrigerant. If one or more failure conditions are satisfied in the step 316, the processor 160 sets corresponding fault codes in the diagnostics and reports the issue to the driver 84 through the display 82 by asserting the notification signal N in the step 318. The processor 160 may take one or more low-side remedial corrective actions in the step 320. The low-side remedial actions may vary, but usually includes notifying the driver 84 and/or shutting down the compressor 102. Thereafter, the integration values may be reset in the step 326. The method 300 subsequently returns to the step 302.

If no failure conditions are satisfied in the step 316, the processor checks for a pass condition in the step 322. If the pass condition is satisfied, the processor 160 reports the pass in the diagnostics in the step 324. The integration values are reset in the step 326, and the method 300 returns to the step 302. If the pass condition is not satisfied in the step 322, the method 300 returns directly to the step 302.

Figure 9:
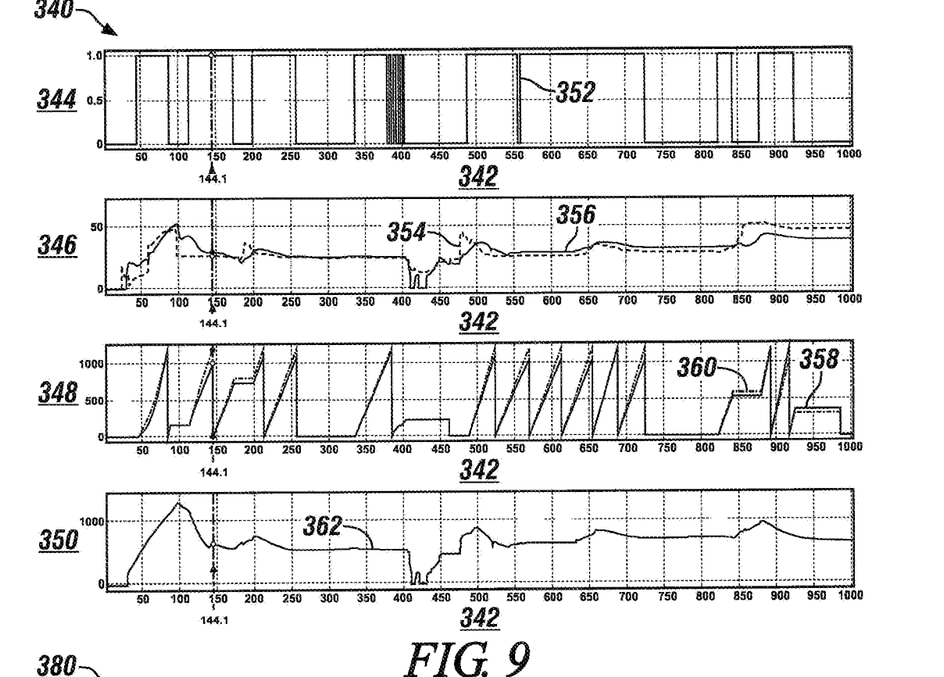
FIG. 9 is a graph of test data where a low-pressure side diagnostic is expected to pass in accordance with one or more exemplary embodiments.

Referring to FIG. 9, a graph 340 of test data where the low-pressure side diagnostic is expected to pass is shown in accordance with one or more exemplary embodiments. The test data was collected from engineering vehicles with normal parts.

The graph 340 has multiple vertical axes and a common horizontal axis 342. The axis 342 illustrates time in units of seconds. A vertical axis 344 illustrates an enable/disable condition of the high-pressure side diagnostics. A value of 1 indicates that the low-pressure side diagnostic is enabled. A value of 0 indicates that the low-pressure side diagnostic is disabled. A curve 352 shows the enabled/disabled condition of the low-pressure side diagnostics as a function of time. While the low-pressure side diagnostic is enabled, the processor 160 calculates the instantaneous mass flow values and the integrated values.

A vertical axis 346 illustrates a range of the instantaneous mass flow rate value calculations in units of grams per second. A curve 354 illustrates the expansion valve mass flow rate values. A curve 356 illustrates the compressor mass flow rate value. Since normal parts were used in the test, some variations are shown between the curves 354 and 356.

A vertical axis 348 illustrates a range of the integrated mass flow rate value calculation in units of grams. A curve 358 shows the integrated compressor mass flow rate value. A curve 360 shows the sum of the integrated expansion valve mass flow rate values. The integrated mass flow curves 358 and 360 show better correlation than curves 354 and 356, typically differing by less than 20%.

A vertical axis 350 illustrates a range of speed for the compressor 102 in units of revolutions per minute. Non-zero values in a curve 362 show when the compressor 102 is running.

Figure 10:
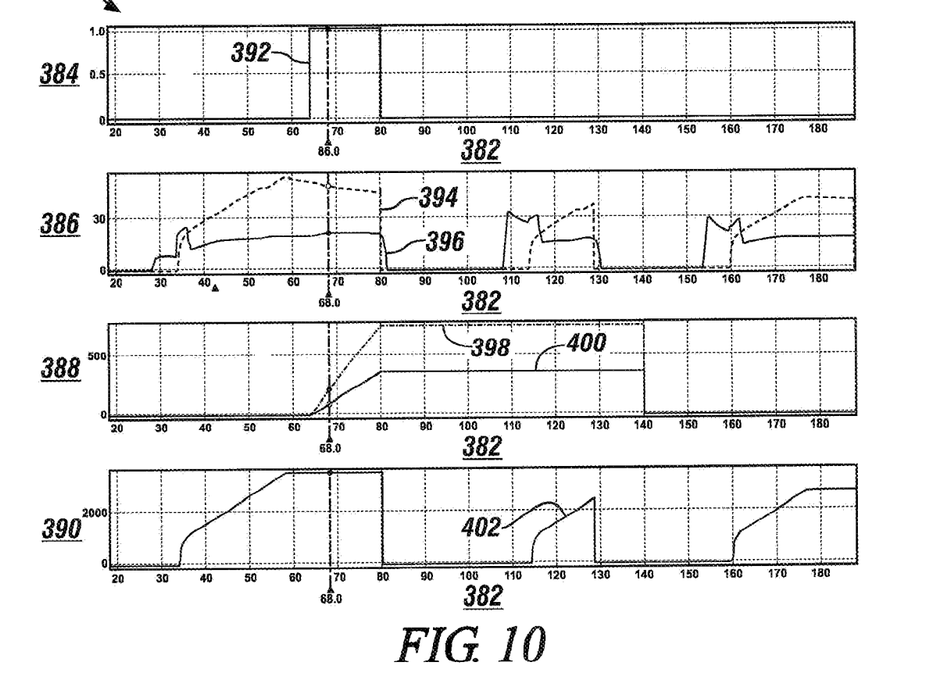
FIG. 10 is a graph of test data where the low-pressure side diagnostic is expected to fail in accordance with one or more exemplary embodiments

Referring to FIG. 10, a graph 380 of test data where the low-pressure side diagnostic is expected to fail is shown in accordance with one or more exemplary embodiments. The test data was collected from engineering vehicles with a degraded compressor 102.

The graph 380 has multiple vertical axes and a common horizontal axis 382. The axis 382 illustrates time in units of seconds. A vertical axis 384 illustrates an enable/disable condition of the high-pressure side diagnostics. A value of 1 indicates that the low-pressure side diagnostic is enabled. A value of 0 indicates that the low-pressure side diagnostic is disabled. A curve 392 shows the enabled/disabled condition of the low-pressure side diagnostics as a function of time. While the low-pressure side diagnostic is enabled, the processor 160 calculates the instantaneous mass flow values and the integrated values.

A vertical axis 386 illustrates a range of the instantaneous mass flow rate value calculations in units of grams per second. A curve 394 illustrates the expansion valve mass flow rate values. A curve 396 illustrates the compressor mass flow rate value. Since a degraded compressor 102 was used in the test, substantial variations existed between the curves 394 and 396.

A vertical axis 388 illustrates a range of the integrated mass flow rate value calculation in units of grams. A curve 398 shows the integrated compressor mass flow rate value. A curve 400 shows the sum of the integrated expansion valve mass flow rate values. The integrated mass flow curves 398 and 400 may differ by greater than 100% due to the degraded compressor 102 not performing as expected.

A vertical axis 390 illustrates a range of speed for the compressor 102 in units of revolutions per minute. Non-zero values in a curve 402 show when the compressor 102 is running. The low-side diagnostic pass/fail is based on differences in integrated mass flow calculations. In the degraded compressor dataset, there is significantly more separation between the integrated mass flows than in a nominally operating system.

Figure 11:
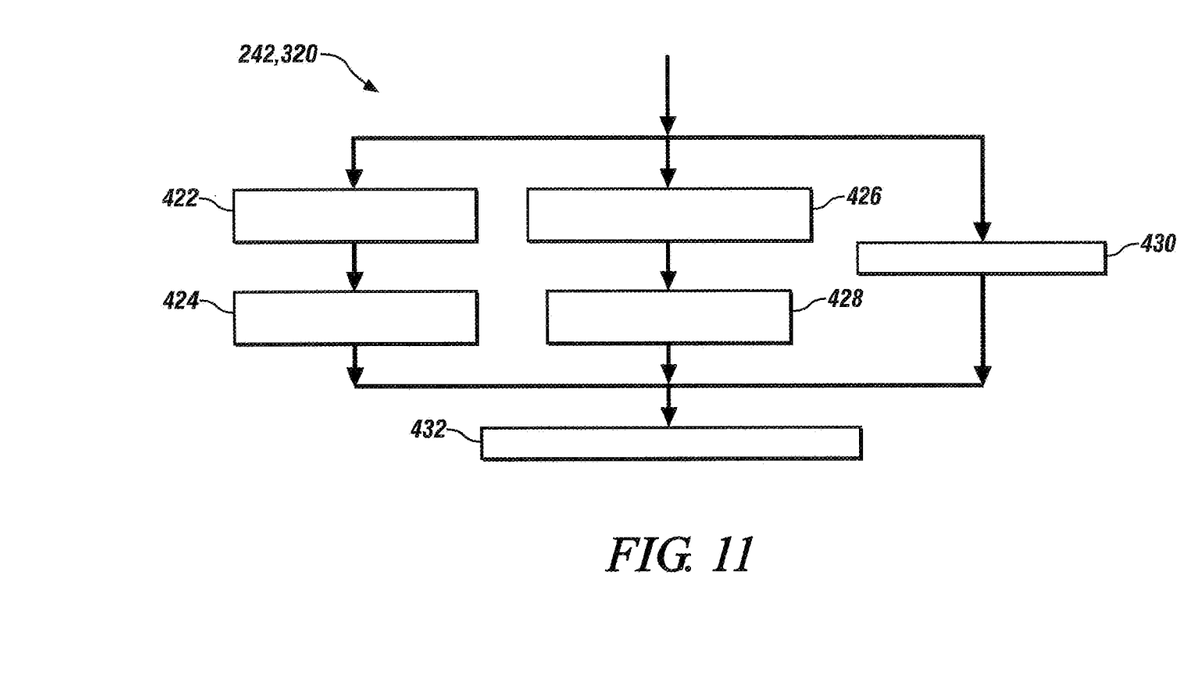
FIG. 11 is a flow diagram of steps for taking remedial action in accordance with one or more exemplary embodiments.

Referring to FIG. 11, a flow diagram of an example implementation of the steps 242 and/or 320 for taking remedial action is shown in accordance with one or more exemplary embodiments. Each step 242/320 generally includes steps 422 to 432. The sequence of steps is shown as a representative example. Other step orders may be implemented to meet the criteria of a particular application.

For issues on the high-pressure side, the processor 160 may actively close one or more refrigerant flow valves 116a-116n in the step 422 to suppress a leak that has been isolated in the high-pressure side by the high-side temperature sensors 124a-124p. The loss of pressure in the individual branches on the high-pressure side causes the corresponding high-side check valve(s) 120a-120n to close in the step 424.

For issues on the low-pressure side, the processor 160 may actively close one or more electronic expansion valves 136a-136n in the step 426 to stop a leak in the low-pressure side. The loss of pressure in one or more branches on the low-pressure side causes one or more low-side check valves 140a-140n to close in the step 428. The processor 160 also has an ability in the step 430 to stop the compressor 102 and shut down the refrigerant system 100. The steps to stop leaks in the high-pressure side, leaks in the low-pressure side, and/or stopping the compressor 102 may be performed in parallel and independently. In the step 432, the processor 160 asserts the notification signal N to the display 82 to alert the driver 84 of the remedial action(s) just taken.

Embodiments of the refrigerant system 100 determine a compressor mass flow using refrigerant pressure sensor and temperature sensor feedback in addition to imperial refrigerant fluid properties and compressor efficiency characteristics. Coefficients of the electronic expansion valves 136a-136n are created and used in combination with the refrigerant fluid properties to calculate the mass flows through the individual electronic expansion valves 136a-136n. Coefficients of the refrigerant flow valves 116a-116n are created and used in combination with the refrigerant fluid properties to calculate the pressure drop through the individual refrigerant flow valves 116a-116n. A conservation of mass principle may be applied to a control volume defined by the low-pressure side of a refrigerant loop for diagnostic purposes. The conservation of mass principle is also applied to a control volume defined by a portion of the high-pressure side of a refrigerant loop for diagnostic purposes. The resulting monitoring technique provides precise diagnostics to protect the hardware of the vehicle 80 and ensure high performing systems.

Evaluations of the refrigerant mass flows are based on direct system response/feedback, and so the decisions are made in real time. The real time decisions enable the benefit of an optimally performing refrigerant system 100. The accurate diagnoses of refrigerant flow issues offers associate hardware protection that may help reduce warranty costs.

While the best modes for carrying out the disclosure have been described in detail, those familiar with the art to which this disclosure relates will recognize various alternative designs and embodiments for practicing the disclosure within the scope of the appended claims.

What is claimed is:

1. A refrigerant system comprising:
   a compressor with an inlet port and an outlet port, configured to receive a refrigerant at a low-side pressure at the inlet port, and configured to present the refrigerant at a first high-side pressure at the outlet port;
   a first high-side pressure sensor in fluid communication with the outlet port of the compressor, and configured to measure the first high-side pressure of the refrigerant;
   a second high-side pressure sensor in fluid communication with the inlet port of the compressor, and configured to measure a second high-side pressure of the refrigerant;
   a plurality of refrigerant flow valves coupled in parallel between the first high-side pressure sensor and the second high-side pressure sensor, wherein the plurality of refrigerant flow valves has a plurality of flow valve positions;
   a low-side pressure sensor in fluid communication with the inlet port of the compressor, and configured to measure the low-side pressure of the refrigerant;
   a plurality of electronic expansion valves coupled in parallel between the low-side pressure sensor and the second high-side pressure sensor, wherein the plurality of electronic expansion valves has a plurality of expansion valve positions; and
   a processor configured to:
      calculate a high-side delta value as a difference between the first high-side pressure as measured and the second high-side pressure as measured;
      calculate an expected delta value between the first high-side pressure and the second high-side pressure based on a ratio of a low-side density of the refrigerant at the inlet port of the compressor to the plurality of flow valve positions;

perform a high-side remedial action in response to the high-side delta value deviating from the expected delta value by greater than a high-side threshold value, wherein the high-side remedial action is at least one of (i) close one or more of the plurality of refrigerant flow valves, (ii) close a corresponding one or more of a plurality of high-side check valves, (iii) stop the compressor, (iv) notify a driver, or (v) any combination thereof;

calculate a sensed delta value as another difference between the second high-side pressure as measured and the low-side pressure as measured;

calculate a plurality of expansion valve mass flow rate values of the refrigerant through the plurality of electronic expansion valves based on the sensed delta value and the plurality of expansion valve positions;

calculate a compressor mass flow rate value of the refrigerant through the compressor; and perform a low-side remedial action in response to a sum of the plurality of expansion valve mass flow rate values deviating from the compressor mass flow rate value by greater than a low-side threshold value, wherein the low-side remedial action is at least one of (i) close one or more of the plurality of electronic expansion valves, (ii) close a corresponding one or more of a plurality of low-side check valves, (iii) stop the compressor, (iv) notify the driver, or (v) any combination thereof.

2. The refrigerant system according to claim 1, further comprising:
a first high-side temperature sensor configured to measure a first high-side temperature of the refrigerant between the outlet port of the compressor and the plurality of refrigerant flow valves, wherein the expected delta value calculated by the processor is based on the first high-side temperature.

3. The refrigerant system according to claim 1, further comprising:
a low-side temperature sensor configured to measure a low-side temperature of the refrigerant proximate the inlet port of the compressor, wherein the expected delta value calculated by the processor is based on the low-side temperature.

4. The refrigerant system according to claim 1, wherein the plurality of high-side check valves are disposed between the plurality of refrigerant flow valves and the second high-side pressure sensor.

5. The refrigerant system according to claim 1, wherein the compressor, the first high-side pressure sensor, the second high-side pressure sensor, the plurality of refrigerant flow valves, and the processor form part of a vehicle.

6. A refrigerant system comprising:
a compressor with an inlet port and an outlet port, and configured to receive a refrigerant at a low-side pressure at the inlet port;
a low-side pressure sensor in fluid communication with the inlet port of the compressor, and configured to measure the low-side pressure of the refrigerant;
a second high-side pressure sensor in fluid communication with the outlet port of the compressor, and configured to measure a second high-side pressure of the refrigerant;

a plurality of electronic expansion valves coupled in parallel between the low-side pressure sensor and the second high-side pressure sensor, wherein the plurality of electronic expansion valves has a plurality of expansion valve positions; and a processor configured to:
calculate a sensed delta value as a difference between the second high-side pressure as measured and the low-side pressure as measured;

calculate a plurality of expansion valve mass flow rate values of the refrigerant through the plurality of electronic expansion valves based on the sensed delta value and the plurality of expansion valve positions;

calculate a compressor mass flow rate value of the refrigerant through the compressor; and perform a low-side remedial action in response to a sum of the plurality of expansion valve mass flow rate values deviating from the compressor mass flow rate value by greater than a low-side threshold value, wherein the low-side remedial action is at least one of (i) close one or more of the plurality of electronic expansion valves, (ii) close a corresponding one or more of a plurality of low-side check valves, (iii) stop the compressor, (iv) notify a driver, or (v) any combination thereof.

7. The refrigerant system according to claim 6, further comprising:
a second high-side temperature sensor configured to measure a second high-side temperature of the refrigerant upstream of the plurality of electronic expansion valves, wherein the plurality of expansion valve mass flow rate values calculated by the processor is based on the second high-side temperature.

8. The refrigerant system according to claim 6, further comprising:
a low-side temperature sensor configured to measure a low-side temperature of the refrigerant proximate the inlet port of the compressor, wherein the compressor mass flow rate value calculated by the processor is based on the low-side temperature.

9. The refrigerant system according to claim 6, wherein the plurality of low-side check valves are disposed between the plurality of electronic expansion valves and the low-side pressure sensor.

10. The refrigerant system according to claim 6, wherein the compressor, the low-side pressure sensor, the second high-side pressure sensor, the plurality of electronic expansion valves, and the processor form part of a vehicle.

11. A method for diagnostics in a refrigerant system comprising:
receiving a refrigerant at a low-side pressure at an inlet port of a compressor;

measuring the low-side pressure of the refrigerant with a low-side pressure sensor in fluid communication with the inlet port of the compressor;

measuring a second high-side pressure of the refrigerant with a second high-side pressure sensor in fluid communication with the inlet port of the compressor;

controlling a plurality of expansion valve positions of a plurality of electronic expansion valves, wherein the plurality of electronic expansion valves are coupled in parallel between the low-side pressure sensor and the second high-side pressure sensor;

calculating a sensed delta value as another difference between the second high-side pressure as measured and the low-side pressure as measured;

calculating a plurality of expansion valve mass flow rate values of the refrigerant through the plurality of electronic expansion valves based on the sensed delta value and the plurality of expansion valve positions;

calculating a compressor mass flow rate value of the refrigerant through the compressor; and performing a low-side remedial action in response to a sum of the plurality of expansion valve mass flow rate values deviating from the compressor mass flow rate value by greater than a low-side threshold value, wherein the low-side remedial action is at least one of (i) closing one or more of the plurality of electronic expansion valves, (ii) closing a corresponding one or more of a plurality of low-side check valves, (iii) stopping the compressor, (iv) notifying a driver, or (v) any combination thereof.

12. The method according to claim 11, further comprising:

presenting the refrigerant at a first high-side pressure through an outlet port of the compressor;

measuring the first high-side pressure of the refrigerant with a first high-side pressure sensor in fluid communication with the outlet port of the compressor;

controlling a plurality of flow valve positions of a plurality of refrigerant flow valves, wherein the plurality of refrigerant flow valves are coupled in parallel between the first high-side pressure sensor and the second high-side pressure sensor;

calculating a high-side delta value as a difference between the first high-side pressure as measured and the second high-side pressure as measured;

calculating an expected delta value between the first high-side pressure and the second high-side pressure based on a ratio of a low-side density of the refrigerant at the inlet port of the compressor to the plurality of flow valve positions; and performing a high-side remedial action in response to the high-side delta value deviating from the expected delta value by greater than a high-side threshold value, wherein the high-side remedial action is at least one of (i) closing one or more of the plurality of refrigerant flow valves, (ii) closing a corresponding one or more of a plurality of high-side check valves, (iii) stopping the compressor, (iv) notifying the driver, or (v) any combination thereof.

13. The method according to claim 12, further comprising:

measuring a first high-side temperature of the refrigerant between the outlet port of the compressor and the plurality of refrigerant flow valves, wherein the expected delta value is based on the first high-side temperature; and measuring a low-side temperature of the refrigerant at the inlet port of the compressor, wherein the expected delta value is based on the low-side temperature.

14. The method according to claim 11, further comprising:

measuring a second high-side temperature of the refrigerant upstream of the plurality of electronic expansion valves, wherein the plurality of expansion valve mass flow rate values is based on the second high-side temperature; and measuring a low-side temperature of the refrigerant proximate the inlet port of the compressor, wherein the compressor mass flow rate value is based on the low-side temperature.

15. The refrigerant system according to claim 6, further comprising:

a first high-side pressure sensor in fluid communication with the outlet port of the compressor, and configured to measure a first high-side pressure of the refrigerant.

16. The refrigerant system according to claim 15, further comprising:

a plurality of refrigerant flow valves coupled in parallel between the first high-side pressure sensor and the second high-side pressure sensor, wherein the plurality of refrigerant flow valves has a plurality of flow valve positions.

17. The refrigerant system according to claim 16, further comprising:

a first high-side temperature sensor configured to measure a first high-side temperature of the refrigerant between the outlet port of the compressor and the plurality of refrigerant flow valves.

18. The refrigerant system according to claim 16, wherein the processor is further configured to control the plurality of flow valve positions of the plurality of refrigerant flow valves to control the refrigerant.

19. The refrigerant system according to claim 6, wherein the processor is further configured to control the plurality of expansion valve positions of the plurality of electronic expansion valves to control the refrigerant.

20. The refrigerant system according to claim 6, further comprising a plurality of evaporators coupled to the plurality of electronic expansion valves.

* * * * *